United States Patent [19]

Takahara et al.

[11] 3,908,824

[45] Sept. 30, 1975

[54] RECORD PROTECTIVE JACKET

[75] Inventors: Ichiro Takahara, Kadoma; Tadahiko Yabu; Takashi Miwa, both of Hirakata, all of Japan

[73] Assignee: Sanyo Electric Co., Ltd., Japan

[22] Filed: Feb. 6, 1974

[21] Appl. No.: 440,198

[30] Foreign Application Priority Data

Feb. 9, 1973 Japan ............................... 48-17324

[52] U.S. Cl. ................ 206/312; 206/815; 206/818; 229/44 R

[51] Int. Cl.².......................................... B65D 85/30

[58] Field of Search ..... 160/DIG. 16; 206/312, 313, 206/387, 449, 815, 818; 220/24 R; 229/44 R, 68 R, 76; 150/3 R

[56] References Cited

UNITED STATES PATENTS

| | | | |
|---|---|---|---|
| 810,294 | 1/1906 | Meaker | 206/815 X |
| 2,784,757 | 3/1957 | Bosca et al. | 206/818 X |
| 2,955,000 | 10/1960 | Vohden | 229/44 R |
| 3,063,619 | 11/1962 | Rhoten | 206/818 X |
| 3,360,258 | 12/1967 | Nix | 206/449 X |
| 3,730,334 | 5/1973 | Tsuji | 206/387 |
| 3,749,301 | 7/1973 | Peckar | 229/44 R |

FOREIGN PATENTS OR APPLICATIONS

| | | | |
|---|---|---|---|
| 664,016 | 1/1952 | United Kingdom | 206/313 |
| 1,176,892 | 8/1964 | Germany | 206/313 |
| 1,195,509 | 6/1965 | Germany | 206/312 |

*Primary Examiner*—William I. Price
*Assistant Examiner*—Steven E. Lipman
*Attorney, Agent, or Firm*—Armstrong, Nikaido & Wegner

[57] ABSTRACT

A record protective jacket for use with a video disc record of a flexible, foil-type which comprises a pair of plate members joined to each other by a spacer. The spacer defined a disc record accommodating room in cooperation with the plate members. One of the plate members is provided with a lid for selectively opening and closing the record accommodating room. A sealing device is provided for substantially hermetically closing the record accommodating room.

1 Claim, 4 Drawing Figures

RECORD PROTECTIVE JACKET

Figure 1:
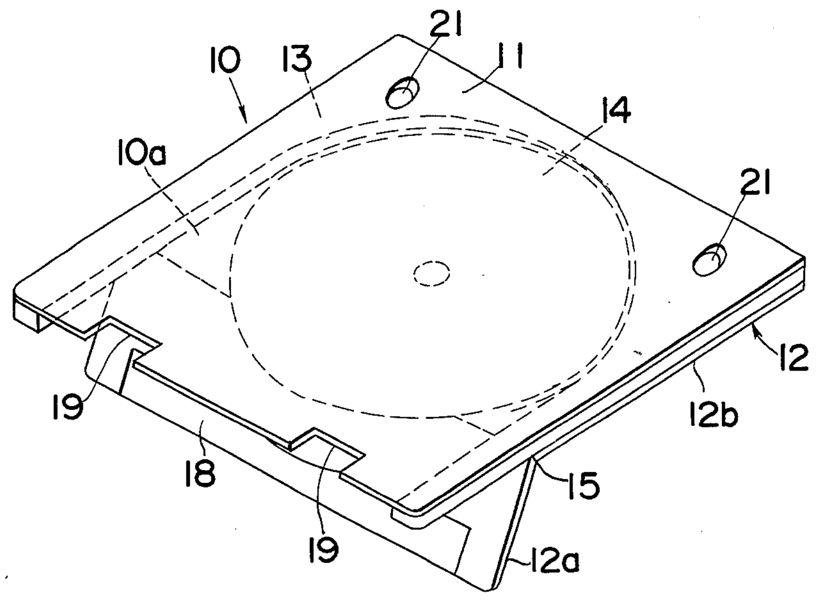

The present invention relates to a protective package and, more particularly, to a protective jacket for accommodating therein a flexible foil-type disc record used in association with a video disc player.

The video disc player is known as an instrument capable of mechanical playback or reproduction, through television receivers, of video or video and audio information previously recorded in the groove on the disc record. Usually, the groove on the disc record inwardly spirally extends to provide information carrier tracks corresponding in number to the number of turns of the groove. One or both of video and audio signals are recorded in this groove after having been frequency-modulated.

In order, for example, to reproduce video information, i.e., one or both of the video and audio signals, that has been recorded on the disc record, a known video disc player employs a disc record driving system by which the disc record is driven only at its center at a relatively high speed, for example, at 1,800 rpm. and, while being rotated, hovers on a rotation-induced air cushion above a stationary plate or table. A scanner having a scanning stylus moves across the disc record in the radial direction with the scanning stylus mechanically engaged and guided in the spiral groove on the disc record.

Unlike the physical nature of a phonograph record, the spiral groove in the video disc record has a track-to-track spacing of less than $10\mu$ and the thickness of the video disc record is in the order of $100\mu$. Furthermore, the video disc record is very light-weight and has a relatively high flexibility.

Because of the physical nature of the video disc record, in order to keep a good reproducibility for a substantially long period of time, each video disc record should be carefully treated or handled and be stored in a protective jacket when in no use. The use of the jacket for protection of the video disc record is truly advantageous in one respect, but in another respect disadvantageous in that the disc record must be taken out of the jacket, when it is to be placed on the video disc player, and during this process of taking out of the jacket, one cannot avoid touching the groove surface of the disc record. The worst of all that may often happen during the process of taking the disc record out of the jacket would be adhesion of dust transferred from fingers of the operator of the video disc player to somewhere on the disc record. This has been long experienced with a jacket for a phonograph record and, if the video disc record contained in a jacket of a similar construction to that for the phonograph record is to be taken out of such jacket, resultant dust adhension on the video disc record often constitute a major cause for reduction in the reproducibility.

This sort of difficulty in handling the lightweight, flexible disc record is imposed on the potential users of video disc players not only when they intend to take the disc record out of the protective jacket, but also when the disc record is to be placed in position on the video disc player and subsequently to be removed from the same player and again inserted into the protective jacket for storage of the disc record.

In view of the foregoing, the video disc record of the type referred to above should, when not in use, be stored in something designed exclusively for accommodation of the video disc record, substantially in a similar way as the phonograph record is done in a vinyl-wrapped paper jacket. It is, therefore, an essential object of the present invention to provide a protective jacket for accommodation of the video disc record of the type referred to above, with substantial elimination of the above described disadvantages.

Another important object of the present invention is to provide the protective jacket of the type referred to above, which is particularly intended for use in association with a video disc player equipped with an automatic disc record feed mechanism.

A further object of the present invention is to provide the protective jacket of the type referred to above, which can be easily assembled and can be manufactured at reasonable cost.

A still further object of the present invention is to provide the protective jacket of the type referred to above, which has a lid for selectively opening and closing the disc record receiving chamber of the jacket and, during closure of the disc record receiving chamber, it substantially helmetically seals the chamber thereby ensuring prevention of entrance of dust in the air into the chamber.

According to preferred embodiments of the present invention, the disc record jacket basically comprises a pair of plate members of the same size secured to each other by means of a spacer shaped to provide a disc record receiving chamber between these plate members. One of the plate members is divided into two portions; one of the two portions serving as a lid for selectively opening and closing the opening leading into the disc record chamber. A sealing device is provided either on the lid or on a portion of the other plate member which faces the lid, which essentially comprises a combination of magnet and metallic strip or a combination of a plurality of outwardly tapered projection and their mating socket-like holes respectively formed on the lid and that portion of the other plate member.

Figure 2:
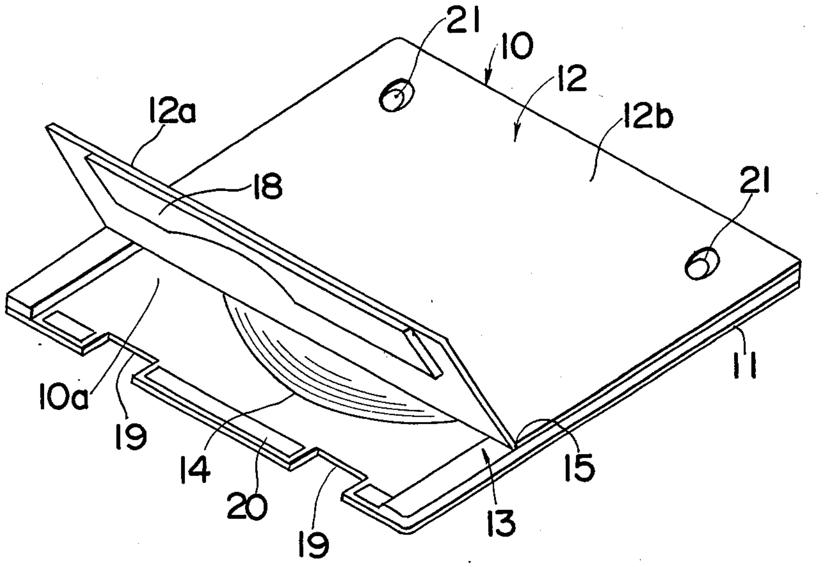
Figure 3:
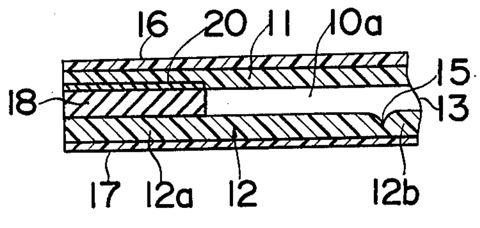
Figure 4:
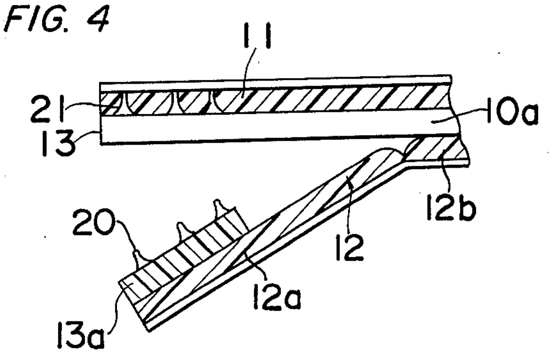

These and other objects and features of the present invention will become apparent from the following description taken in conjunction with preferred embodiments thereof with reference to the accompanying drawings, in which;

FIG. 1 is a perspective view of a disc record jacket according to one embodiment of the present invention, as viewed from top, FIG. 2 is a perspective view of the disc record jacket of FIG. 1, as viewed from bottom, FIG. 3 is a side sectional view, on an enlarged scale, of an essential portion of the disc record jacket of FIG. 1, showing a manner by which a lid is closed, and FIG. 4 is a similar view to FIG. 3, but showing another method for closing the lid.

Before the description of the present invention proceeds, it should be noted that like parts are designated by like reference numerals throughout the accompanying drawings. It is also to be noted that, though the jacket constructed in accordance with the present invention can, depending upon the shape and/or size thereof, be used in any way for accommodating therein any type of sheet-like or bulky material such as valuable document, book, magnetic tape on a reel or in a cassette or cartridge, and so on, other than the disc record of the type referred to above, the present invention will be described as employed for accommodating therein the disc record of the type referred to above.

Referring now to FIGS. 1 to 3, a protective jacket generally designated by 10 and being of substantially square shape, comprises a pair of upper and lower plates 11 and 12 of the same size which are joined to each other by means of a spacer 13 of a thickness preferably slightly greater than the thickness of the disc record 14. The spacer 13 is so shaped as to define, when held in position between the upper and lower plates 11 and 12, a disc record receiving chamber 10a into which the disc record 14 is inserted or from which the disc record 14 is taken out of the jacket, and for this purpose, the spacer 13 is of substantially U-shaped configuration. The disc record receiving chamber 10*a* is preferably so sized that the flexible foil-type disc record 14 can be steadily held therein without arbitrarily moving within said chamber 10*a* during, for example, transportation from one place to another.

All the elements forming the protective jacket 10 so far described may be made of any suitable material such as cardboard, carton, metal and synthetic resin and is preferably made of synthetic resin having a sufficient hardness. The jacket with these elements may be integrally formed, or otherwise molded, into a single-piece construction.

The front edges of the upper and lower plates 11 and 12, which are not joined to each other by means of the spacer 13, provide an entrance of the protective jacket 10 through which the disc record is inserted into or taken out from the disc record receiving chamber 10*a* and which can be selectively opened and closed in a manner as will now be described.

The lower plate 12 is provided, as at 15, with a line of weakness, for example, in the form of a V-shaped groove, which extends widthwise in parallel to and spaced a predetermined distance from the plane of the entrance of the protective jacket 10, i.e., the front edge of the lower plate 12, and which substantially divides the lower plate 12 into two portions 12*a* and 12*b*. A front portion of the lower plate 12, designated by 12*a* and distincted from the rest portion 12*b* by the line of weakness 15, serves as a hingedly supported lid.

If at least the lower plate 12 is made of polyethylene or polyvinyl chloride, repeated alternate closing and opening of the lid 12*a*, that is, repeated bending of the lower plate 12 along the line of weakness 15, in a reasonable number of times does not result in separation of the lid 12*a* from the remaining portion 12*b* of the lower plate 12 because of a sufficient resistance to bending the polyethylene or polyvinyl chloride has. In view of this and in practice, the upper and lower plates 11 and 12 are preferably made of polyvinyl chloride while the spacer is, because of a good processability or workability, made of acrylic resin.

Either or both of the whole outer surfaces of the upper and lower plates 11 and 12 may be, as best shown in FIG. 3, plated with sheets 16 and 17 of polyvinyl chloride, in which case one or both of the vinyl sheets 16 and 17 may bear thereon any designation identifying the content accommodated within the chamber 10*a* and/or any description or representation concerning the content within the chamber 10*a*, either printed or labelled.

Particularly, if at least the sheet 17 is employed, the lid 12*a* may be made separate of the portion 12*b* in which case the sheet 17 serves to join the lid 12*a* to the portion 12*b* and a portion of the sheet 17 along the joint between the lid 12*a* and the portion 12*b* substantially serves as a line of weakness about which the lid 12*a* is hinged.

A band of magnetizable material, which may be either a magnet or an elastic or rubber strip composed of a mixture of powdered magnet and elastic resin, is provided as at 18 on the front inner surface of the lid 12*a* and extends in parallel to the plane of the entrance of the jacket 10, the function of which will become clear from the subsequent description.

The upper plate 11 is formed at its front edge with a pair of spaced notches or access openings 19 through which fingers can touch the lid 12*a* for opening the disc record receiving chamber 10*a*. So far as opening of the lid 12a is carried out manually, the number of the access openings 19 may not be limited to two as in the case of the illustrated embodiment, but a single access opening may be sufficient. However, an automatic lid opener disclosed as a part of the video disc player in the copending U.S. Pat. application No. 422,865, entitled "Video Disc Player" and filed on Dec. 7, 1973, requires the provision of at least two access openings to enable the lid 12*a* to be automatically opened.

According to the above mentioned copending patent application, the automatic lid opener comprises a pivotally supported lever having one end formed with a pair of forks engageable to the lid 12a through the access openings 19 and a method for selectively opening and closing the lid 12*a* is such that, as the jacket 10 is inserted into the jacket receiving chamber of a jacket holder, the forks are engaged to the lid 12*a* through the access openings 19 and further movement of the jacket 10 into the jacket receiving chamber causes the lid 12*a* to be downwardly drawn pivoting about the line of weakness 15 while said lever pivots against a biasing spring, thereby opening the lid 12*a*. Closure of the lid 12*a* is effected during removal of the jacket 10 from the jacket receiving chamber of the jacket holder. In this automatic lid opener, if the jacket 10 is incorrectly inserted into the jacket receiving chamber, no engagement of the forks to the lid 12*a* takes place and no further movement of the jacket 10 into the jacket receiving chamber takes place, but the jacket 10 is stopped by the forks within the jacket receiving chamber. In any event, reference may be made to the above copending patent application for the detailed information while the latter is herein omitted because it is not the subject of the present invention.

Cooperative with the magnetizable material band 18 is at least one band of ferrous material, for example, a metallic foil, which is embedded as at 20 on the front edge of the upper plate 11. Therefore, it is clear that closure of the lid 12*a* is effected by the magnetic attraction between the magnetizable band 18 and the metallic band 20. It should be noted that these bands 18 and 20 may be reversed in position with respect to that shown in FIGS. 1 to 3.

A pair of holes 21 formed in the jacket 10 adjacent the rear thereof and each entirely extending through the elements 11, 13 and 12, are provided for engagement with stopper pins forming parts of a jacket locking and ejecting mechanism that has been disclosed in the above copending patent application for locking the inserted jacket in place within the jacket receiving chamber of the jacket holder. The detailed information of these holes 21 is also available from the above copending application and is, therefore, herein omitted for the sake of brevity.

According to another embodiment shown in FIG. 4, the sealing device, that has been described as comprising the bands 18 and 20 in the foregoing embodiment, comprises a plurality of outwardly tapered projections each having a height substantially equal to or slightly smaller than the thickness of the upper plate 11 and secured to, or otherwise integrally formed with, the lid 12*a* through a spacer piece 13*a*, and a corresponding number of mating sockets 21 formed in the upper plate 11 for receiving the respective projections 20 therein when the lid 12*a* is closed.

Even this embodiment of FIG. 4 functions satisfactorily in a similar manner as the embodiment of FIGS. 1 to 3 does.

Although the present invention has been fully described by way of example with reference to the accompanying drawings, it should be noted that various changes and modifications are apparent to those skilled in the art. By way of example, if the jacket 10 is made of synthetic resin, application of antistatic agent or chemical destaticizer is recommended. Furthermore, in the case where the jacket 10 is not exclusively intended for use with the automatic lid opener, a lug or similar projection may be formed in the lid instead of the employment of the access openings 19.

Therefore, unless otherwise such changes and modifications depart from the true scope of the present invention, they should be construed as included therein.

What is claimed is:

1. A protective jacket for accommodating therein a flexible foil-type disc record comprising:

first and second plate members;

a substantially U-shaped spacer secured to said first and second plate members thereby joining said first and second plate members to each other while forming a chamber therebetween for receiving therein said disc record through an opening defined between said first and second plate members and said spacer;

a lid provided in the first plate member for selectively closing and opening said chamber to enable the disc record to be confined within said chamber and to be taken out of said chamber, respectively;

hinge means for hingedly supporting said lid to said first plate member, said hinge means being positioned on said first plate member to permit a portion of the disc record to be exposed to the outside of the protective jacket when said lid is in position to open said chamber;

at least one pair of access openings formed in a spaced relation to each other in one edge portion of said second plate member adjacent said opening defined by said first and second plate members and said spacer, each of said access openings terminating at a position which is adjacent the outer periphery of the disc record accommodated within said chamber and which does not overlap said outer periphery of said disc record; and separate means for connecting said lid to said second plate member thereby substantially sealing the opening of said chamber, a portion of said second plate member which is opposed to said separate means being flush with the inside surface of said second plate member while a corresponding portion of said first plate member which faces said portion of said second plate member is projected towards said second plate member a distance corresponding to the thickness of said spacer.

* * * * *